Aug. 12, 1941.　　　　D. H. KENNY　　　　2,252,009
VEHICLE CONTROL SYSTEM
Filed Sept. 20, 1938　　　2 Sheets-Sheet 2

Inventor
Douglas H. Kenny
by Wright Brown Quinby & May
Attys.

Patented Aug. 12, 1941

2,252,009

UNITED STATES PATENT OFFICE 2,252,009

VEHICLE CONTROL SYSTEM

Douglas H. Kenny, Boston, Mass., assignor of forty-nine one-hundredths to Morris Nadell, Boston, Mass.

Application September 20, 1938, Serial No. 230,894

10 Claims. (Cl. 192—.01)

This invention relates to control systems for vehicles, and more particularly to vehicles driven by a prime mover such as an internal combustion engine where it is necessary to apply load after the prime mover has been started and to effect the drive through successively decreasing gear ratios as the vehicle picks up speed.

The present invention has for an object to eliminate all necessity of any selection or gear shifting by the operator of the vehicle, this being done automatically in accordance with the speed of the vehicle and without any attention on the part of the operator.

For a more complete understanding of this invention, reference may be had to the accompanying drawings in which—

Figure 1:
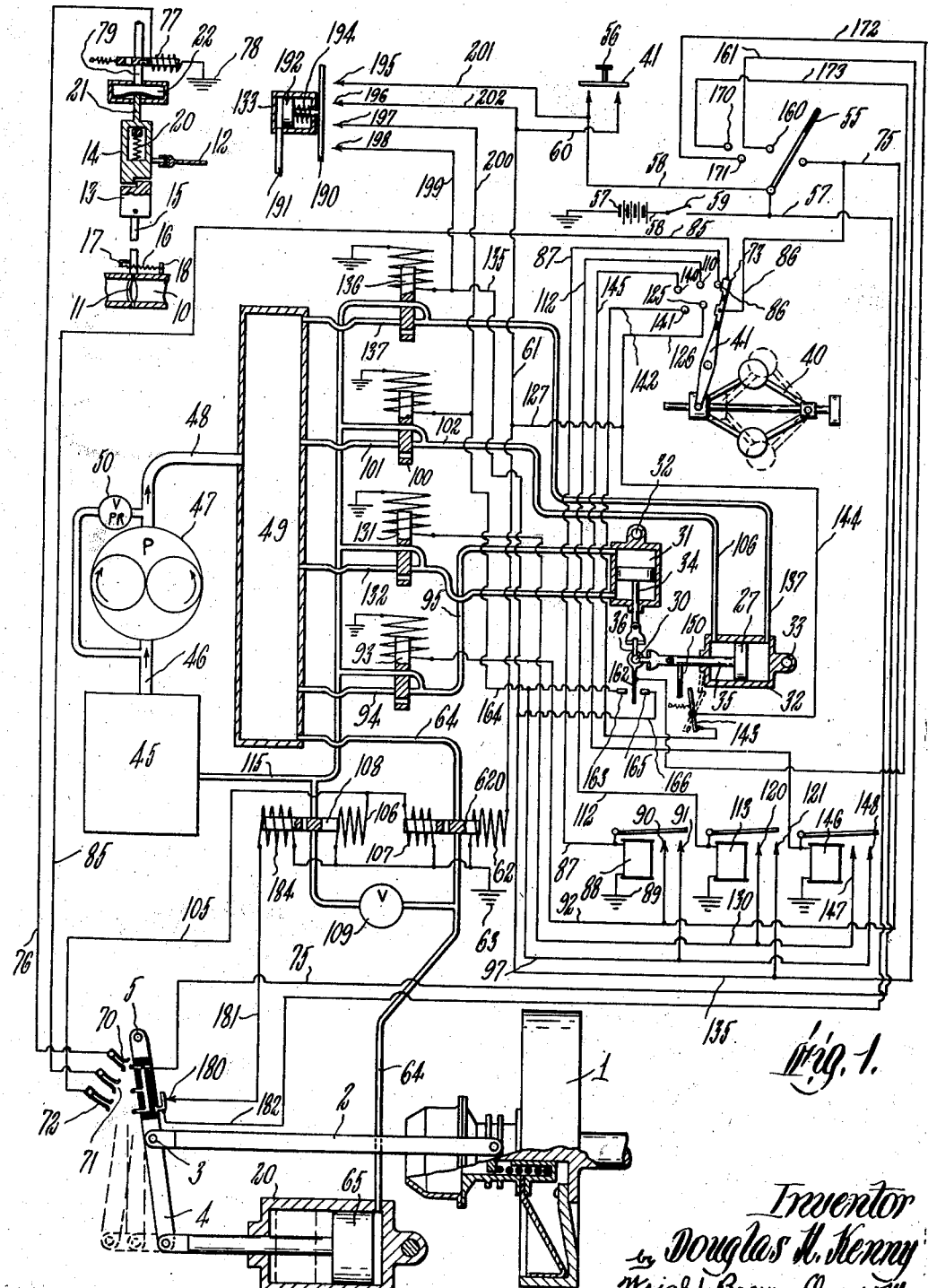
Figure 1 is a diagram of a system embodying the invention and wherein hydraulic pressure electrically controlled is employed for shifting gears and for operating the clutch.

Referring first to the diagram of Figure 1, at 1 is shown somewhat conventionally the clutch of a motor vehicle spring-pressed to closed position, and opened by mechanical means through the movement to the left, as viewed in this figure, of an actuating bar 2. This bar is shown as pivoted at 3 to the clutch-actuating lever 4 fulcrumed at 5. This lever 4 corresponds to the clutch release pedal lever of an automobile of the conventional type, but in this embodiment no foot-engaging portion need be employed since there is no occasion for the operator to actuate it himself.

Also shown somewhat diagrammatically in Figure 1 is a gas intake line 10 having a control valve 11 therein. This control valve is normally under the control of an accelerator pedal, a portion of this being indicated diagrammatically at 12, but interposed between the pedal and the valve 10 is a clutch comprising a pair of clutch elements 13 and 14. The clutch element 13 is fixed to the rock shaft 15 which actuates the valve 11 and a coil spring 16 engaging at opposite ends on an arm 17 carried by the shaft 15 and a fixed pin 18 normally tends to hold the valve 11 closed. The clutch element 14 is axially movable into and out of clutching engagement with the member 13 and is normally held in such engagement as by the spring 20. It is provided with an extension 21 which projects through an opening in a vacuum chamber 22 and carries a diaphragm so that when a vacuum is produced in the chamber the clutch element 14 will be drawn away from the element 13 and thus disconnect the throttle 12 from the valve 11 and permit the spring 16 to close it. The purpose of this will later appear.

Figure 4:
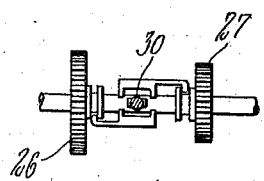
Figure 4 is a detail section on line 4—4 of Figure 3.
Figure 3:
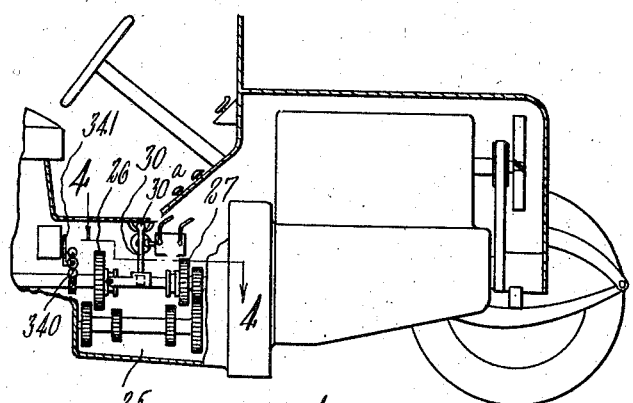
Figure 3 is a somewhat conventional fragmentary view partly in elevation and partly in section and showing the application to the gear shift of the actuating and controlling mechanism shown diagrammatically in Figures 1 and 2.

At 25 in Figure 4 is illustrated a conventional transmission having sliding gears 26 and 27 which are movable in the well known manner to change from one to another speed or to reverse driving connections. This gear shifting may be accomplished by movement of a control arm 30 in the usual H form of the standard shift, but here again as this shifting is not required to be manually operated, the usual actuating handle which extends within reach of the operator may be omitted, the arm terminating at its ball pivot 30a. Such a shifting mechanism requires movement of its control lever in two angularly related directions, one longitudinally of the vehicle and the other laterally thereof, and for the purpose of performing the desired motions of this shift lever to produce the desired gear change, a pair of hydraulic cylinders 31 and 32 have been provided. Each of these hydraulic cylinders is shown as pivotally mounted as at 32 and 33 and contains a piston provided with a piston rod 34, 35. These piston rods are arranged at right angles to each other and each is connected to the shift arm 30 through a flexible link 36. By suitable actuation of these hydraulic motor units 31 and 32 the shift lever can be made to take its proper positions for the three forward speeds normally employed, neutral, and the reverse gear connections. The operations of these will be later described.

The control by which these operations are effected includes a speed-responsive device shown as a centrifugal governor 40, the speed of rotation of which governs the angular position of a contact lever 41, this contact lever establishing such electrical connections as the governor speed increases or decreases by predetermined amounts or to predetermined values as to insure the proper gears in the transmission being effective to transmit power. This governor is rotated as long as the car is in motion and may be connected to any suitable rotating part, the rotation of which is controlled by the motion of the vehicle. For example, it may be connected to the speedometer worm gear on the vehicle drive or propeller shaft. Power for effecting the shifting of gears in the transmission and for releasing and closing the clutch may be derived as shown in Figure 1 through a hydraulic system. Such a hydraulic system may comprise, for example, a source of liquid supply 45 from which liquid such as oil, or the like, is taken through the pipe 46 by a suitable pump 47 from which the fluid under pressure passes through a pipe 48 to a tank 49. This pump 47 is connected up in any suitable manner to the vehicle engine so that whenever the engine is running, the pressure pump is also running, but in order that excess pressure of fluid may not be produced, the pump 47 may be by-passed by a pressure relief valve at 50 so that as long as the tank 49 is supplied with fluid under pressure, the pump merely circulates the fluid idly, it escaping from the pipe 48 through the valve 50 and back to the intake side of the pump or to the storage tank 45.

The control of the fluid pressure mechanism to accomplish the desired gear changes is shown as accomplished electrically, the major controls, which are actuated by the operator, being a switch 55 which may be set in any selected of three positions, neutral, forward and reverse, and a push button switch 56. Assuming that the driver wishes to move forward, he starts the engine in the usual manner, no connections for this being shown herein, this starting the pump P and establishing pressure fluid in the tank 49. The governor 40 is not then in motion because this is connected with the vehicle drive mechanism and does not begin to turn until the vehicle moves. The switch lever 55 being in the forward position, the button 56 is momentarily depressed. This establishes a connection from the battery 57 through the lead 58, main control switch 59, through the contact button 41, leads 60 and 61 to the solenoid 62 of the valve 620 and to ground at 63. Energization of the solenoid 62 of the valve 620 opens a connection through the passage 64 from the reservoir 49 to the clutch cylinder 20, forcing the piston 65 to the left and releasing the clutch by the motion of the bar 2. This also effects serially electrical connections at 70, 71 and 72 which accomplish the following results.

The first connection is made at 70 between the lead 75 to the switch arm 55 to the battery, and through the lead 76 to the normally closed solenoid-opened valve 77 and to ground at 78. The actuation of the solenoid of valve 77 opens a passage 79 to vacuum, which results in withdrawing the clutch element 14, and disconnecting the accelerator pedal from the throttle, which allows the throttle to close. The closure of the contact at 71 connects the lead 75 from the switch arm 55 with the lead 85, which connects to the contact 73 of arm 41 of the governor. This contact 73 connects with contact 86 which is connected through the lead 87 with the relay 88 and then to ground at 89. Energization of the relay 88 closes contacts at 90 and 91 to the lead 87. By closing the contact at 90 the lead 87 is connected to the lead 92 which goes to the solenoid of the valve 93 and acts to move this valve to open communication through the conduit 94 with the conduit 95 leading to the gear shifting cylinder 31 above its piston, thus shifting the lever downwardly as viewed in Figure 1 from its neutral position. Closing of the contacts at 91 acts to energize through the lead 97, the solenoid of the valve 100 which thereupon opens connection from the conduit 101 to the conduit 102 to the shift cylinder 32, moving its piston to the right and completing the placing of the gears in first speed and while the clutch is open and the throttle closed.

Closing of the contact at 72 results in energizing the lead 105 from the lead 75 which passes to the two solenoids 106 and 107. The energization of the solenoids 160 and 107 opens the valve 108 and shuts off the valve 620, thus opening the cylinder 20 to discharge through the throttle valve 109 to the supply tank 45. The clutch spring then acts to close the clutch, the valve 109 acting by its adjustment to ease the closing action to the desired extent. The closing of the clutch breaks the contacts at 72, 71 and 70, de-energizing the solenoid of valve 77 so that the throttle is returned to pedal control, the lead 85 and governor contact 73 is de-energized which results in de-energizing the relay 88, opening the circuit at the contacts 90 and 91, allowing the valves 93 and 100 to discharge fluid under pressure from the shifting cylinders 31 and 32. The vehicle is then in first gear forward with the clutch closed and the throttle under control by the foot pedal, the solenoid-opened valve 77 being closed so that the vehicle starts forward and rotation of the governor 40 begins.

As the speed of the vehicle increases causing increase of governor speed, the contact 73 of arm 41 is moved from contact 86 to make contact at 110 with the lead 112 and at 125 with the lead 126 both from the lead 86.

The connection of contact 125 to the lead 86 by the swinging of the switch arm 34 acts through the leads 126 and 127 which joins the lead 61 to energize the solenoid 62 and move the valve 620 to open connection from the fluid pressure reservoir 49 through the conduit 64 back of the piston 65, thus to throw out the clutch 2 and to make the connections serially at 70, 71 and 72, as previously described, to cause the gas throttle to be closed and ultimately the clutch to be reengaged. The making of the connection at the contact 71 energizes the contact 73, which now being connected at 110 to the lead 112 causes the relay 113 to close, and makes connection with contacts 120 and 121. The closing of the contact at 120 acts to energize the lead 130 leading to the solenoid-actuated valve 131 and causes this valve to open connection through the conduit 132 to the cylinder 31 in a direction to force the piston therein upwardly and move the gear shift lever laterally from its neutral position. The closing of the contact at 121 energizes the lead 135 and actuates the solenoid-actuated valve 136 to open a connection through the conduit 137 to the right hand end of the cylinder 32, thus to force the piston 27 therein to the left, the combined actions of these last two circuits placing the shift lever in the second speed position, this being accomplished before the clutch is returned to clutching position. It will be noted that when the clutch lever 4 moves to clutch-closed position, it breaks connection at 70, permitting a spring to return the valve 77 to close off vacuum connection, whereupon the clutch element 14 is moved by its spring 20 into clutching relation to the throttle so that the throttle is again under the control of the foot pedal, and the breaking of the connection at 71 de-energizes the governor arm contact 37, de-energizing the relay 113, breaking connection at 120 and 121 and permitting the valve 131 and 136 to cause discharge from the shifting cylinders 31 and 32.

By depressing the accelerator pedal the engine is further accelerated, thus speeding up the governor 40 and moving the switch arm 41 until contact 73 connects with the contacts 140 and line 86 connects with contact 141. Connection of the lead 86 with the contact 141 energizes the lead 142 which passes through a normally closed switch at 143 to a lead 144 connecting with the lead 126. This, also, through its connection to the lead 127, acts to move the valve 620 to the right, opening the conduit 64 to the clutch cylinder 20 so as to release the clutch, and the clutch lever then goes through its cycle of operations as previously described.

The closure of connection to the contact 140 energizes the lead 145 after the clutch contact 71 has been closed by the opening of the clutch, which closes the relay 146, and this completes the circuit through the contacts 147 and 148. The contact at 147 energizes the lead 130 and moves the valve 131 to open the conduit 132 to the shift cylinder 31 to move its piston upwardly, and the closing of the contact 148 energizes the lead 97 to move the valve 100 to open fluid pressure to the left hand end of the shift cylinder 32. These motions move the shift lever into high speed position. A dog 150 on the rod 35, when the piston of cylinder 32 is moved to high speed position, strikes the switch 143 and opens it. This acts to prevent a reduction in speed of the vehicle to a point which would cause the lever 34 to make contact at 110 and 125 from throwing into action the shift mechanism to return to second speed, it being necessary for the governor to drop back to a still lower speed where the contacts 73 and 86 connect before this can happen. If it is desired to remain in second speed to use the engine as a brake going down hill, the switch 59 is opened when the car is in second speed so that an increase in car speed will not be effective to shift to high gear.

It will be noted that when the switch arm 55 is in the neutral position, the electric power is cut off from the lead 86 so that the arm 34 is inoperative to make electrical connections, no matter what the speed of the governor may happen to be, and that connection is made through the contact at 160 to the lead 161 to the switch arm 162 carried by the gear shift lever 30. Should this shift lever be in its left hand position engaging the contact 163, the lead 164 to the solenoid-operated valve 100 is energized, opening connection to the cylinder 27 in a direction to break connection with the contact 163, while if it should be in engagement with the contact 165, it energizes the lead 166 which connects with the lead 135 and operates the valve 136 to open fluid pressure connections to the opposite end of the cylinder 137. Thus, in whichever of its end positions the shifting lever may be, it is moved back therefrom to the mid or neutral position.

Should the control lever 55 be moved back to the reverse position, it connects the contacts 170 and 171 which energizes the leads 172 and 173. The energization of the lead 173 which connects to the lead 92 moves the valve 93 in a direction to move the piston 34 downwardly while the energization of the lead 172 energizes the lead 135 which moves the valve 136 to open connection through the cylinder 137 and moves the shift lever to the left, these two motions shifting it into reverse after the button 56 has been depressed to energize the lead 60 and move the valve 620 to disconnect the clutch.

It will be noted that whenever the clutch is closed a contact is made at 180 between the leads 181 and 182, the lead 182 connecting direct to the battery line 57, while the lead 180 connects through the solenoid 184 to the ground at 63, this acting to hold the valve 108 closed, shutting off the passage 64 from the return line 115.

Means are also provided by which when emergency application of the brakes is made, the shift lever is returned to neutral from whatever position it may be in. This is done through the switch arm 190 which is actuated under predetermined pressure in the brake fluid pressure line 191 acting back of the piston 192 in a cylinder 193 against the action of a spring 194. When the braking pressure is raised sufficiently, as when an emergency application is being made, the arm 190 makes connection with all the contacts 195, 196, 197 and 198. This opens connection from the pressure reservoir 49 to opposite ends of the cylinder 32 through energization of the leads 199 and 200 from the contact 195 and line 201, while the closing of the contact 196 energizes the line 202, which through the line 61, opens the valve 620 to disconnect the clutch by pressure in the cylinder 20.

Figure 2:
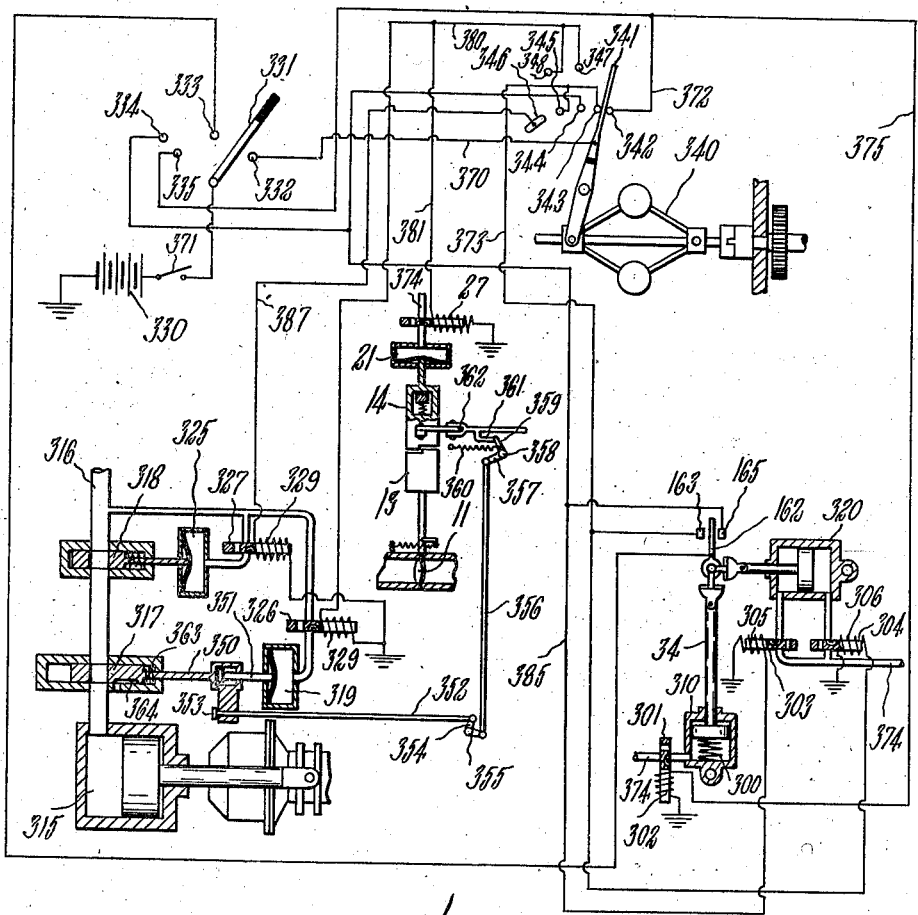
Figure 2 is a diagram of a system in which clutch and gears are actuated by vacuum through electrical control.

In Figure 2 is shown a diagram wherein the shifting of the gear shift lever is accomplished through vacuum rather than through fluid under pressure. Thus vacuum cylinders 310 and 320 are employed in place of the pressure cylinders 31 and 32 of Figure 1. The shifting mechanism is identical, except that there is no dog 150 and the cylinder 310 is open to the fluid system at one end only, a spring 300 being employed to normally pull the rod 34 into its upward position. Vacuum connections to the lower portion of the cylinder 310 are made through the valve 301, normally closed, and opened through energization of the solenoid 302. Vacuum connections to opposite ends of the cylinder 320 are controlled by normally closed valves 303 and 304 through the solenoids 305 and 306, respectively. The clutch may be thrown out by connecting a vacuum cylinder 315 with the vacuum line 316 by moving the normally closed valve 317 to open position. There is also a normally open vacuum closed valve 318. The valve 317 has a bleeder port 3170 connecting cylinder 315 to the atmosphere, when the valve cuts off from the vacuum pipe 316, which allows the clutch to close. These valves 317 and 318 are arranged to be actuated by the vacuum cylinders 319 and 325, respectively, connections thereto being controlled by the normally closed valves 326 and 327, respectively, which are opened by energization of their coils 328 and 329, respectively.

The accelerator pedal is arranged for connection to the gas throttle valve 11 through the clutch elements 13 and 14 and the vacuum cylinder 21 is controlled by the normally closed valve 27 just as in Figure 1.

The source of electric power is indicated at 330 and a manually set control switch at 331 which may selectively engage the forward contact 332, the neutral contact 333, and the reverse contacts 334 and 335. At 340 is shown the centrifugal governor for moving a pivoted arm 341 serially from engagement with the contacts 342 and 343 to the contacts 344, 345 and 346 as the speed of the rotation of the governor increases. When connecting with contacts 344 and 345, respectively, the arm 341 also connects with contacts 347 and 348, respectively. This governor may be actuated as previously described.

The valve 317 is connected to the vacuum cylinder 319 through a pair of members 350 and 351 which have lost motion connection with each other, and the member 350 is also connected with lost motion to a rod 352 having a head 353 on one end which limits the extent of lost motion in one direction. Thus the valve 317 may be moved into the position shown in Figure 2 either by vacuum in the cylinder 319 or by a pull exerted on the rod 352. This rod 352 is connected through a bell crank lever 354 fulcrumed at 355 to a rod 356, which, in its turn, is connected to one arm of a bell crank lever 357 fulcrumed at 358. The arm 359 of this bell crank lever 357 is normally acted upon by a pull spring 360 in a direction to hold the rod 352 in the position shown in Figure 2 with the valve 317 held open. This bell crank lever arm 359, however, may be contacted by a part 361 on the clutch pedal mechanism 362 so that as the pedal is depressed the bell crank lever 357 is rocked in a direction to release the rod 352, permitting the valve 317 to be closed by its spring 363. This opens a bleeder port 364 to the atmosphere and to the interior of the vacuum cylinder 315 which allows the clutch to close.

Assuming that it is desired to start the car, the engine is started, which immediately provides vacuum in the pipe 316, and the parts being in the position shown in Figure 2, this causes vacuum within the cylinder 315 to throw out the engine clutch. The switch arm 331 is then moved to its forward position, engaging the contact 332. This energizes the lead 370, assuming the main switch 371 to be closed, and through the switch arm 341 energizes the lines 372 and 373. Energization of the line 373 energizes the solenoid 306 which then connects the right hand side of the cylinder 320 with the vacuum pipe 374, causing a shifting action of the gear shift lever to the right as viewed in this figure, or toward the front of the car, while the energization of the lead 372 acting through the lead 375 energizes coil 302 and opens the valve 301 to the vacuum pipe 374 and pulls the shift lever downwardly as viewed in this figure, or crosswise of the car, these two motions making the necessary connections in the transmission for low speed forward. The operator then depresses the accelerator pedal, relieving the rod 352, and allowing the valve 317 to close, which as before described, closes the clutch. The car now is moving in low speed forward and a further depression of the accelerator pedal accelerates it, causing the governor 340 to move the arm 341 out of connection with the contacts 342 and 343, allowing the valves 306 and 301 to close from vacuum. The piston in cylinder 320 remaining in its right hand position, the spring 300 is unable to move the rod 34. The governor arm then engages the contacts 344 and 347. Engaging the contact 347 energizes the leads 380 and 381, opening the cylinder 21 to the vacuum line 374 and disconnecting the throttle valve 11. Energization of the lead 380 also energizes the solenoid 329, opening the valve 326 so as to connect the cylinder 319 to the vacuum pipe 316, and disconnecting the clutch. The operator then relieves pressure on the accelerator. The clutch being open and connection being made between the arm 341 and the contact 344, energizes the line 385 which energizes the coil 305 and opens the valve 303 to the cylinder 320, which thus moves the shift lever in one direction toward second speed position, and the spring 300 moves the rod 334 and completes the shifting of the clutch lever to second speed position. The speeding up of the governor causing the switch arm 341 to pass beyond connection with the contacts 344 and 347 deenergizes the solenoids 27 and 329, permits the accelerator pedal to again control the throttle valve 11, and the first depression of this accelerator pedal acting through the rod 356 and 352, allows the valve 317 to close which permits the clutch to close. Further acceleration then speeds up the governor 340 which causes the arm 341 to engage the contacts 345 and 348, which through energization of the lead 380, again disconnects the accelerator from the throttle 11, permitting this to close and opens the valve 306 to vacuum and throws the shift lever into high speed position. The inertia of the parts causes the lever 341 to be thrown beyond the contacts 348 and 345 into connection with the contact 346. This closes a connection through the lead 387 to the solenoid 329 which opens vacuum connection to the cylinder 325 and closes the valve 318, so that the clutch is then out of control by the valve 317 so that this clutch cannot be opened until the speed of the car is sufficiently reduced for the arm 341 to drop back out of engagement with the contact 346.

With the switch arm 331 placed in neutral position the shift lever is returned to its neutral position by mechanism including the switch arm 162 and contacts 163 and 165, which operate in the same manner as described in connection with Figure 1. With the switch 331 thrown to reverse it energizes the contacts 334 and 335 which energizes the solenoids 305 and 301, resulting in placing the shift lever in its reverse position, the actuation of the accelerator pedal thereafter effecting the closing of the main clutch in the manner previously described.

From the foregoing description of certain embodiments of this invention, it should be evident to those skilled in the art that various further changes and modifications might be made without departing from the spirit or scope of this invention as defined by the appended claims.

I claim:

1. A control system for a vehicle having a motor, a propeller shaft, change gear mechanism between said motor and shaft, and a main clutch interposed between said motor and shaft, said system including a speed responsive means connected to be driven by said propeller shaft, means driven by said motor for producing fluid pressure, means actuated by fluid from said producing means for shifting said mechanism from one speed ratio to another and for actuating said clutch, means controlled by said speed responsive mechanism for controlling said clutch actuating means to open said clutch, and means rendered operative by the opening of said clutch to render said speed responsive device operative to control said shifting means to shift said change gear mechanism in accordance with the speed of the device and then to actuate said clutch actuating means to close said clutch.

2. A vehicle control system for a vehicle having a motor, a throttle for said motor, a propeller shaft, change gear mechanism, and a main clutch interposed between said motor and shaft, said system including a speed-responsive device connected to be driven by said propeller shaft, means controlled by said device to close said throttle and then automatically open said clutch, shift said mechanism and then close said clutch as the rate of rotation of said propeller shaft increases by predetermined steps, and means effective when said shaft has reached a certain speed for delaying the actuation of said shift mechanism on reduction of speed to a speed below that at which the previous increased speed shift took place.

3. A control system for a vehicle having a motor, and operator-controlled means normally controlling the speed of said motor, a propeller shaft, change gear mechanism between said motor and shaft having a shift device movable in two angularly related relations, and a clutch interposed between said motor and shaft, said system including a speed-responsive device connected to be driven by said propeller shaft, a pair of motor devices connected to move said shift device in said two directions, a motor device controlling said clutch, and means controlled by the response of said responsive device to actuate said motor devices to render inoperative said operator-controlled means to throw out said clutch, and means responsive to the opening of said clutch and to said speed-responsive device to move said shift devices at predetermined speeds, said system including means controlling said clutch motor device to close said clutch after said shift device has been moved and to return the speed control of said motor to said operator-controlled means.

4. A control system for a vehicle having a motor, an operator-controlled means normally controlling the speed of said motor a propeller shaft, change gear mechanism between said motor and shaft having a shift device movable in two angularly related directions, and a clutch interposed between said motor and shaft, said system including a speed-responsive device connected to be driven by said propeller shaft, a pair of motor devices connected to move said shift device in said two directions, a motor device controlling said clutch, and electrical means controlled by the response of said responsive device causing said motor devices to render inoperative said operator-controlled means and throw out said clutch, and means responsive to the opening of said clutch and to said speed responsive device to move said shift devices at predetermined speeds, said system including means controlling said clutch motor device to close said clutch after said shift device has been moved and to return the speed control of said motor to said operator-controlled means.

5. A control system for a vehicle having a motor, a propeller shaft, change gear mechanism between said motor and shaft having a shift device movable in two angularly related directions, and a clutch interposed between said motor and shaft, said system including a speed-responsive device connected to be driven by said propeller shaft, a pair of motor devices connected to move said shift device in said two directions, a motor device controlling said clutch, electrical means controlled by the response of said responsive device causing said motor devices to throw out said clutch, and electrical means responsive to the throwing out of said clutch and to said response to move said shift devices at predetermined speeds, and to then close said clutch.

6. A control system for a vehicle having an internal combustion motor, operator-controlled means for normally controlling the motor speed, a propeller shaft, change gear means between said motor and shaft having a shift device movable in two angularly related directions, and a clutch interposed between said motor and shaft, said system including a vacuum pipe communicating with said motor, a device responsive to the speed of rotation of said propeller shaft, a pair of vacuum-actuated means for moving said shift device in said two directions, vacuum-actuated means for opening said clutch, vacuum means for operatively disconnecting said operator-controlled means, valves interposed between said pipe and vacuum-actuated means, means controlled by the response of said speed-responsive device to actuate said valves to open said clutch, and means responsive to the opening of said clutch and to said response to shift said shift device, said system including means for closing said clutch and returning said operator-controlled means to motor speed control after said shifting device has been actuated.

7. A control system for a vehicle having a motor, a propeller shaft, change gear mechanism between said motor and shaft, said mechanism having a neutral condition in which it is inoperative to transmit power from said motor to said shaft, and a main clutch interposed between said motor and shaft, said system including a speed-responsive means connected to be driven by said propeller shaft, means controlled by said speed-responsive means for automatically opening said clutch and shifting said mechanism from one speed ratio to another in accordance with the speed of said propeller shaft, said system also having means for closing said clutch after the shifting of said mechanism has been effected, a brake for the vehicle, and means responsive to emergency brake application to place said change gear mechanism in neutral condition.

8. A control system for a vehicle having a motor, a propeller shaft, change gear mechanism between said motor and shaft, said mechanism having a neutral condition in which it is inoperative to transmit power from said motor to said shaft, and a main clutch interposed between said motor and shaft, said system including a speed-responsive means connected to be driven by said propeller shaft, means controlled by said speed-responsive means for automatically opening said clutch and shifting said mechanism from one speed ratio to another in accordance with the speed of said propeller shaft, said system also having means for closing said clutch after the shifting of said mechanism has been effected, a brake for the vehicle, and means responsive to emergency brake application to place said change gear mechanism in neutral condition and to open said clutch.

9. A control system for a vehicle having a motor, a propeller shaft, change gear mechanism between said motor and shaft, said mechanism having a neutral position in which it is inoperative to transmit power from said motor to said shaft, and a main clutch interposed between said motor and shaft, said system including a speed-responsive means connected to be driven by said propeller shaft, means controlled by said speed-responsive means for automatically opening said clutch and shifting said mechanism from one speed ratio to another in accordance with the speed of said propeller shaft, said system also having means for closing said clutch after the shifting of said mechanism has been effected, a brake for the vehicle including a fluid pressure line, and means responsive to a predetermined pressure in said line for conditioning said system to place said change gear mechanism in neutral condition and to throw out said clutch as when an emergency application of the brake is being made.

10. A control system for a vehicle having a motor, a propeller shaft, change gear mechanism between said motor and shaft, said mechanism having a neutral condition in which it is inoperative to transmit motion from said motor to said shaft, fluid pressure mechanism for operating said change gear mechanism to change from one to another driving ratio and to place in neutral condition, electrical means for controlling said fluid pressure mechanism, a vehicle brake, driver controlled means for actuating said brake, and means responsive to a predetermined pressure of brake application to condition said electrical means to cause said mechanism to assume neutral condition.

DOUGLAS H. KENNY.